United States Patent [19]

Lindvall

[11] 4,370,991

[45] Feb. 1, 1983

[54] DIP TREATING APPARATUS

[76] Inventor: Sture S. Lindvall, Henrik Palmes Allé 18, Djursholm S-182 62, Sweden

[21] Appl. No.: 283,638

[22] Filed: Jul. 15, 1981

[30] Foreign Application Priority Data

Aug. 14, 1980 [SE] Sweden ............................. 8005749

[51] Int. Cl.³ ............................................. B08B 3/04
[52] U.S. Cl. .................................. 134/76; 134/154; 134/164
[58] Field of Search ................... 134/76, 77, 154, 164

[56] References Cited

U.S. PATENT DOCUMENTS

| 2,920,548 | 1/1960 | Copenhefer | 134/76 |
| 2,965,110 | 12/1960 | Borodin | 134/76 |
| 3,013,678 | 12/1961 | Clark | 134/77 X |
| 3,786,824 | 1/1974 | Lhenry | 134/76 X |

Primary Examiner—Robert L. Bleutge
Attorney, Agent, or Firm—Fred Philpitt

[57] ABSTRACT

In a dip treating apparatus for carrying out a multiple-step process, e.g. for film processing, the objects to be treated are transferred in separate groups step by step through a row of stations by means of a series of individually operatable conveyors, one for each adjacent pair of stations. Each such conveyor comprises a vertically extending guideway along which a slide member is reciprocatable by means of a working cylinder, the piston of which is pneumatically driven at an operating speed controlled by a flow of liquid through a variable restriction. The slide member of each conveyor carries a rocker swingable about a transverse horizontal axis and including a pair of downwardly extending rocker arms having means at their lower ends for catching the various groups of objects to be treated and transferring them from one station to the next, the swing axis of the rocker being always above the level at which the various groups of objects are picked up and delivered by the catching means of the related rocker. The slide member further carries an arm serving as a splash-shield between adjacent stations and operative to restrict any excessive swinging motion of the groups of objects at their transfers.

7 Claims, 9 Drawing Figures

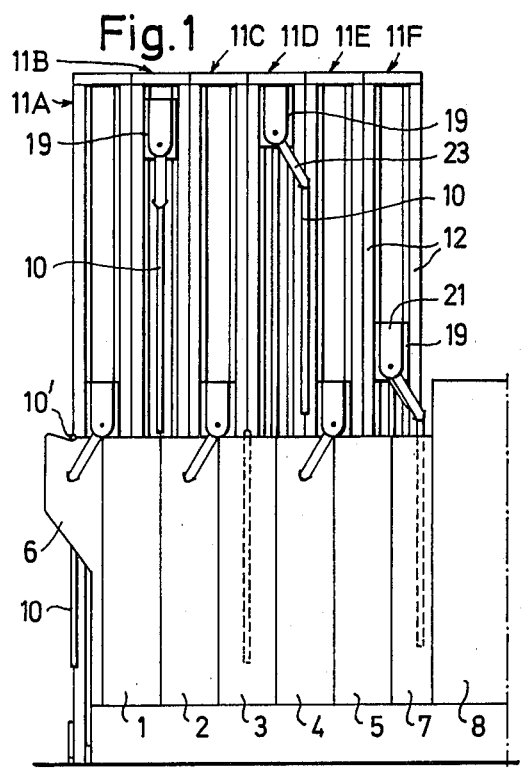
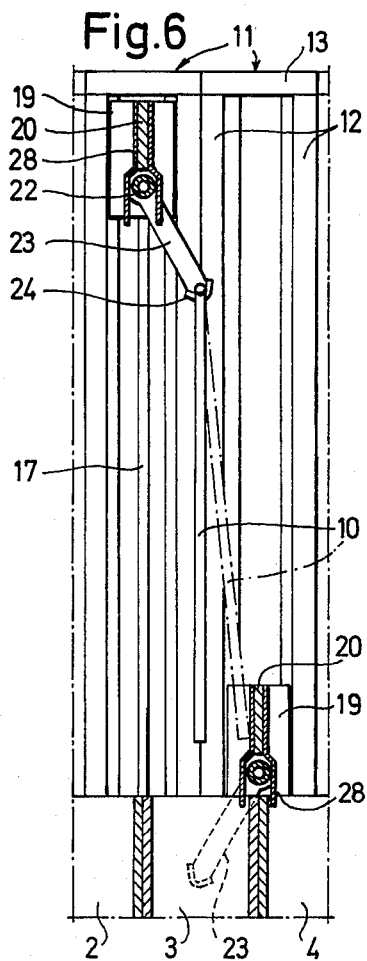
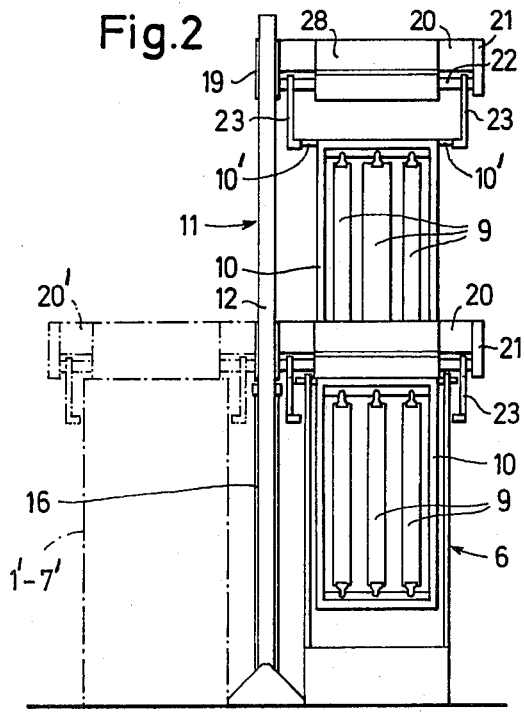

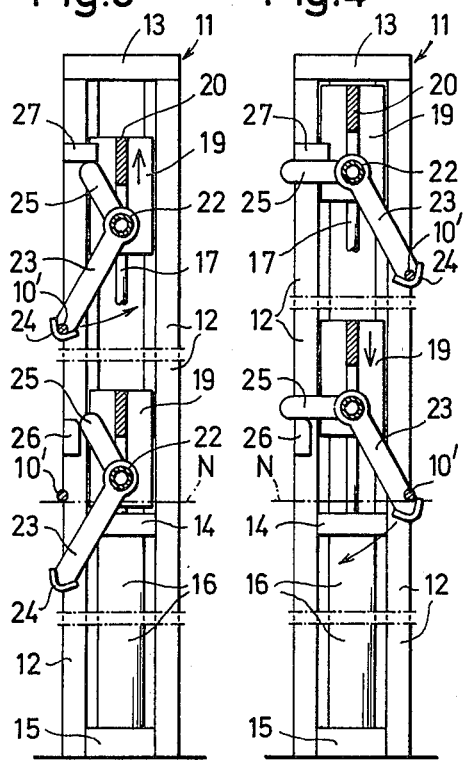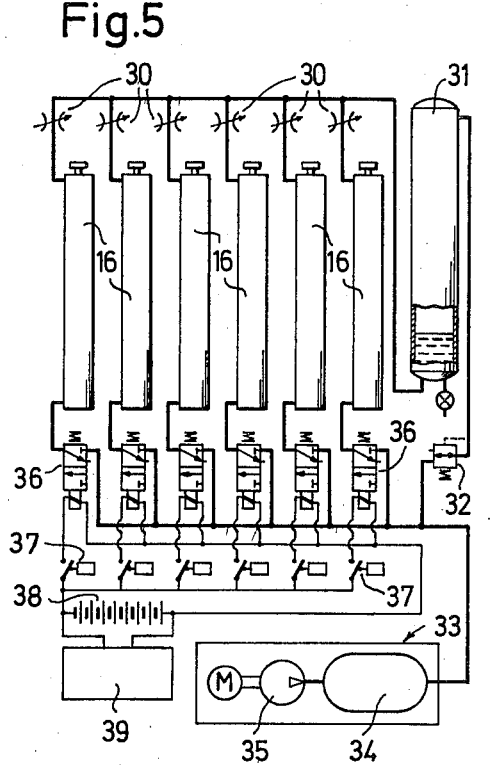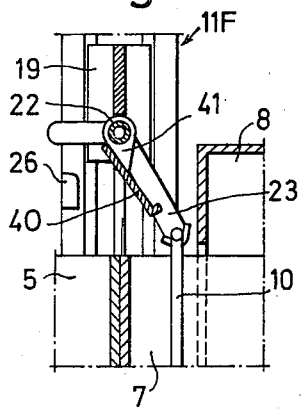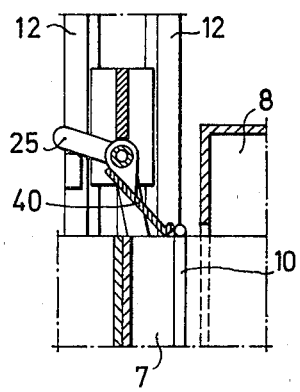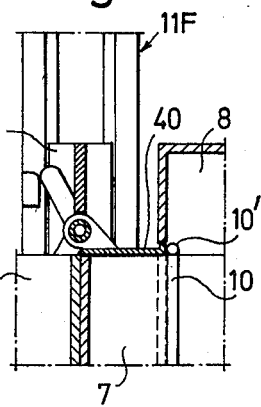

DIP TREATING APPARATUS

BACKGROUND OF THE INVENTION

This invention relates to a dip treating apparatus for carrying out a multiple-step process, in which the objects to be treated have to remain for predetermined periods of time in a number of different treating baths. As typical examples of processes of this kind those for developing or processing photographic films and for etching printed circuit cards may be mentioned, but the range of uses of the apparatus is in no way restricted thereto.

More specifically the invention is concerned with an apparatus of the kind just mentioned comprising in combination a plurality of stations arranged in a row, one after the other, and all being designed to receive at least partially uniform carriers of the objects to be treated, at least two consecutive ones of said stations including containers for treatment baths, and a related series of conveyors, each of which is adapted to transfer one carrier at the time between two adjacent stations only, each such conveyor comprising a slide member reciprocatable by means of a driving mechanism along a vertical guideway arranged to one side of the two stations to be served, said slide member carrying a rocker swingable about a horizontal pivot axis between two operative positions, means being provided for forcibly changing the position of said rocker when the slide member during its reciprocating movement approaches its respective end positions, said rocker including at least one catching means operative to engage the carrier to be transferred, said catching means being arranged to move in the direction between the two stations served by the conveyor when the rocker is forced to change its position.

An apparatus of this general kind is previously known through the French Patent Publication No. 1 273 343 and offers in comparison with most other known dip treating apparatus, e.g. for film processing, many obvious advantages, among which the most prominent one probably is that, in spite of the fact that several carriers with related groups of objects may simultaneously be on their way through the apparatus, there is a possibility in each one of the different stations to select an uninterrupted dwell time for the carriers that is fully independent of the desired dwell time in all the other stations.

However, the structural design of the apparatus disclosed in the French Patent Publication just referred to is disadvantageous from many points of view and, in particular, makes it impossible to locate the bath containers of the apparatus in close relationship, one after and adjacent the other, which on one hand results in a considerable spaced requirement and on the other hand prevents the containers from bracing themselves against each other, whereby they have to be constructed with very strong walls if there is a need for a great container depth and a great container width counted across the direction of feed of the carriers, which is frequently the case in practice. Evidently this is due to the facts that the conveyors of the known apparatus are of such construction that for their proper operation they need a free space between the containers and that the driving mechanisms of the conveyors are bulky and thus require a substantial distance between the stations. In addition, the various driving mechanisms of the known apparatus have to be connected to a common driving motor through a mechanical power transmission system which is very difficult to expand, should there arise a need for increasing the number of stations in the apparatus.

SUMMARY OF THE INVENTION

The aim of the present invention is to provide an apparatus of the kind defined hereinbefore which is as compact as possible in the direction of feed of the carriers therethrough and in which it further is possible to use stations having a very moderate extent in said direction of feed, whereby the necessary bath volumes in the containers of the apparatus can be reduced to a minimum in relation to the depth and width of the containers.

In accordance with the invention this aim is achieved primarily by the fact that the horizontal pivot axis of the rocker of each conveyor is supported by the related slide member in a manner to remain, throughout the entire vertical stroke of the slide member, above the level at which the carriers when being transferred between the two stations served by the conveyor are picked up and delivered by the catching means of the rocker, said catching means being arranged to move along a path extending below the pivot axis of the rocker whenever the latter is forced to change its position. In a dip treating apparatus thus improved it is possible to locate the bath containers, which ordinarily represent most of the stations included in the apparatus, closely together and in propping contact with one another.

Most frequently it is desirable in an apparatus of the kind here defined to use carriers for one or more objects to be treated which together with the objects attached thereto form transport units capable of hanging down in a freely swingable manner from the catching means of the rocker of the conveyor when being transferred between the two stations served by the latter. In such a case it has been found advantageous to support the horizontal pivot axis of the rocker by an arm connected to the slide member and projecting outwardly therefrom over the row of stations approximately midway between the two stations served by the conveyor and to let said arm form, when the slide member is in its lowermost end position, an obstruction restricting any excessive swinging movements of the transport unit being transferred by the immediately proceding conveyor in the apparatus. Such an arrangement makes it possible to minimize the extent of each station in the direction of feed of the various carriers by eliminating the possible risk of lowering an elevated carrier into the wrong station ahead.

Preferably such a rocker supporting arm is then given such a shape that it will also form, possibly together with portions of the rocker, a splash-protecting shield extending over substantially the entire width of the stations. Also, the rocker supporting arm may carry a swingable lid which, when the related slide member is lowered, is deposited over one of the two stations served by the conveyor.

As will be readily understood the possibility of making the apparatus compact is also a matter of using conveyors requiring a minimum of space particularly in the direction of feed of the various carriers through the apparatus. Accordingly, in the preferred embodiment of the invention the driving mechanism of the slide member comprises a working cylinder mounted in an upright position under the slide member and housing a double-acting piston connected thereto, one side of said piston being directly impactable by compressed air whereas the other side thereof is only indirectly actuated by an air pressure, namely through a quantity of liquid, the working cylinder being provided with a stroke rate regulator including a restriction through which the liquid is caused to flow in response to the movements of the piston. With a driving mechanism of this kind a very compact and also very reliable conveyor for each pair of adjacent stations in the apparatus is achieved and, in addition, such conveyors may be made independent of an uninterrupted supply of electric current throughout the processing cycle.

When using the driving mechanisms referred to above it is preferred to arrange the piston of the working cylinder in such a manner that in elevating the related slide member it operates against a back pressure created by a quantity of air enclosed in a vessel located outside the working cylinder. Such an arrangement considerably simplifies the control system of the apparatus.

Further, in the preferred embodiment of the invention the slide member, the guideway for the same, and the working cylinder of each conveyor form together a separate operational unit, which is easily replaceable in the apparatus. This will highly facilitate any repairs and also make it possible to expand the apparatus, whenever desirable, by adding one or more such units.

BRIEF DESCRIPTION OF THE DRAWINGS

For further elucidation of the invention a preferred embodiment thereof will be described in the following, reference being had therein to the accompanying drawings. In the drawings:

FIG. 1 is a highly simplified side view of a dip treating apparatus embodying the invention, FIG. 2 is an end view of the apparatus as seen from the left in FIG. 1 and intimates by dash-and-dot-lines a possibility of supplementing the apparatus in such a manner that it may be used, when needed, for carrying out two different processes, FIGS. 3 and 4 illustrate on a larger scale and partly diagrammatically the mode of operation of the conveyors included in the apparatus, FIG. 5 is a simplified diagram illustrating the circuit coupling of the main pneumatic and electric components incorporated in the apparatus.

FIG. 6 illustrates the swing-restricting action of the shield supported by the slide member, and FIGS. 7-9 show how one of the conveyors of the apparatus has been completed with a lid that is used to form a light lock for a drying chamber connected to the apparatus.

As best appears from FIG. 1 there is included in the illustrated apparatus a plurality of upwardly open containers 1-5 arranged in a row, one after the other, all said containers having a rectangular horizontal section with only a small dimension in the direction of the row. These containers are disposed side by side in close relationship on a suitable bed or base in a manner to brace themselves against one another, whereby they may be made with a moderate wall thickness even if their depths and their widths measured across the direction of the row are considerable. In front of the first container 1 in the row there is an inlet section 6, and the last container 5 abuts an outlet section 7 forming a kind of feeding-in lock to a drying chamber 8. Each of the containers 1 to 5 and the sections 6 and 7 represent one station in the apparatus which in the case illustrated is assumed to be an apparatus for developing colour film in the form of strips 9 (FIG. 2) mounted in stretched positions in rectangular frames 10 serving as carriers. These carrier frames 10 are preferably identical in size and structure and each of them has at its upper end a pair of opposite, laterally extending pins 10' adapted to project above and slightly beyond the upper edges of the end walls of the containers 1 to 5 and the sections 6 and 7 in order to thus support the related frame when the latter is submerged in any one of the various stations of the apparatus.

For developing the film strips 9, the frames 10 have to be transferred in succession between the various containers 1 to 5 and to be kept submerged for predetermined time periods in each one of them. The transfer is accomplished by means of a series of conveyors 11A to 11F after the frames having single or groups of film strips attached thereto have been hung up, normally by hand, in the inlet section 6. The first conveyor 11A then transfers one frame at a time from the inlet section 6 to the first container 1, from where the frame is later forwarded to the second container 2 by means of the second conveyor 11B and so on until it finally reaches the drying chamber 8 via the outlet section 7. The dwell time or the duration of stay in the various stations for each and all of the frames 10 being on their way through the apparatus is determined by known timers or by a programmed controller unit and can be selected or adjusted as needed entirely independent of the dwell time in all the other stations. However, there must not be more than one single frame at a time in each station and, consequently, no frame transfer is to be allowed unless the next station is, or at the same time is made, free to receive the next frame. From this it follows that the longest necessary treating time in any one of the containers will be a factor determining the operating pace of the apparatus. In addition, for reasons to be set forth in the following, it is desirable, although not absolutely necessary, that two adjacent conveyors are not in operation simultaneously.

Each conveyor 11 comprises two parallel, vertically extending guide rails 12 having opposed flanges and being held together in spaced relationship at a predetermined distance from each other by a first crosspiece 13 at their upper ends, by a second crosspiece 14 approximately halfway between their ends, and by a third crosspiece 15 at their lower ends. The crosspieces 14 and 15 at the same time form upper and lower end pieces for a vertically mounted working cylinder 16, in which a double-acting piston, not shown, is reciprocatable. This piston is by means of a piston rod 17 extending upwards through the crosspiece 14 connected to a slide member 19 which is a well guided manner is reciprocatable along and between the two guide rails 12 from a lower end position in the vicinity of the crosspieces 14 to an upper end position in the vicinity of the crosspiece 13 and back again. The slide member 19 is provided with a laterally projecting arm 20 formed as a plate standing on edge and acting as a splash-shield. At its outer end this arm or bracket has an end piece 21 between which and the slide member 19 there extends a horizontal shaft 22 that is rotatably journalled in both. To this shaft 22 two parallel rocker arms 23 extending in the same directions from the shaft are secured, one in the vicinity of the slide member 19 and the other in the vicinity of the end piece 22. These two rocker arms 23 are mirror pictures of one another and have their lower end portions formed into catching means 24 adapted for picking up and carrying each one of the two projecting pins 10' on the carriers or frames 10 to be transferred between the two stations served by each conveyor 11 in the apparatus. The shaft 22 and the arms 23 with their catching means 24 together form a kind of rocker.

Adjacent the slide member 19 and on the side thereof which is found most suitable from case to case there is, as best appears from FIGS. 3 and 4, also secured to the shaft 22 a lever 25 adapted to co-operate with lugs or abutments 26 and 27 on one of the guide rails 12 in such a manner that the shaft 22 is imparted a definite angular movement relative to the slide member 19 in one direction when the slide member approaches its uppermost end position and in the opposite direction when the slide member approaches its lowermost end position. This will clearly appear from FIGS. 3 and 4 which both illustrate the slide member 19 in two different positions. Thus, when the slide member is on its way upwards—as in the upper part of FIG. 3—the lever 25 abuts the upper lug 27, whereby the shaft 22 is rotated in counterclockwise direction and the rocker arms 23 are swung over into the positions illustrated in the upper part of FIG. 4. Later, when the slide member is on its way downwards—as in the lower part of FIG. 4—the lever 25 instead abuts the lower lug 26, whereby the shaft 22 is rotated in clockwise direction and the rocker arms 23 are swung back into their original position illustrated in the lower part of FIG. 3. Unintentional rotation of the shaft 22 and swinging of the rocker arms 23, for instance under the influence of the weight of the frames 10, is prevented by means of frictional or arresting means, not shown, it being understood, of course, that such means have to be of a kind not changing or disturbing the motion pattern of the rockers as illustrated in FIGS. 3 and 4.

It is to be noted that the arm 20 as well as the rocker shaft 22 of each and all of the conveyors 11 throughout the entire operating cycle of the latter remain in positions above the level, indicated at N in FIGS. 3 and 4, at which the frames 10 are picked up and delivered when transferred. In addition, the rocker arms 23 are operative outside of the respective end walls of the various stations. This means that the conveyors 11 will never interfere with the containers 1–5 and the sections 6 and 7 of the apparatus. In the example shown the level N coincides with the upper edges of the end walls of the containers and it should be understood that these end walls do not need to be of the same height as the mutually abutting side walls of the containers, i.e. the walls thereof extending across the direction of feed of the carriers. Also it should be noted that even moderately elevating the slide members of the various conveyors of the apparatus will make the containers 1–5 as well as the inlet and outlet sections 6 and 7 freely accessible, for instance for replacement or cleaning.

It should be clear that the slide member 19 of each conveyor 11, which thus serves only two adjacent stations in the apparatus, is responsible for the elevating and lowering of the frames 10, whereas the rocker arms 23 with their catching means 24 are responsible for the transfer of the frames in the feeding direction from one station to the next. In this connection it is to be noted that the vertical stroke of the slide member has to be somewhat larger than the required lifting height of the frame, because the final swing of the rocker arms 23 returning them to their initial position (as shown in the lower part of FIG. 3) must take place after the delivery of the handled frame with its pins 10" resting on the upper edges of the end walls of the frame receiving container, which edges can suitably be provided with small positioning recesses for the pins. The lifting height of the frame should in turn be chosen such that the frame after having been elevated vertically can be passed on to the next station by means of the swinging rocker arms without meeting any obstructions on its way. It has been found desirable in practice to make the lifting and lowering movements of the frames rather rapid but to make the actual transfer of the frame between the two served stations rather slow. Nevertheless there is always a certain risk that the freely suspended frame 10 when being transferred from one station to the next is imparted a swinging motion which might hazard the correct lowering of the frame in the receiving station and which is particularly objectionable if the stations have a very limited extent in the direction of feed of the frames as is desirable in order to minimize the volume of the various bath containers the depths and widths of which are determined mainly by the size of the carrier frames.

In the apparatus shown this problem is eliminated by the fact that the shield-forming arm 20 of the slide member 19 of the conveyor immediately ahead will serve as a barrier restricting any excessive forwardly swinging movement of the transferred frame 10 substantially as is indicated by dash-and-dot lines in FIG. 6. Accordingly, the conveyor immediately ahead of an operative one should be inoperative and have its slide member in a lowered position generally straight above the double boundary wall between the receiving station and the next station in the apparatus. At the same time the arm 20 of the lowered slide member 19 will serve as a protector against undesirable splash-over of bath liquid between the stations, and this is particularly the case if it is provided on both sides with skirts 28 extending downwardly beyond the shaft 22 and straddling the double wall between the stations as indicated in FIGS. 2 and 6. This latter arrangement also prevents such splashing over of liquids between adjacent containers in the apparatus that may result from an agitation of the liquid baths by forcing a gaseous medium through nozzles in the lower parts of the containers, which nowadays is a rather common practice. Of course, if such agitation is used, it should preferably be interrupted temporarily in the two containers between which a frame transfer is going on.

As previously mentioned, the driving mechanism for the slide member 19 in each conveyor 11 includes a working cylinder 16 vertically mounted directly under the slide member 19 and housing a double-acting piston. In order to obtain desirable yieldability and smoothness in the operation of the slide member and in order to provide at the same time an apparatus which is capable of completing a given treatment programme also in case of disturbances, for example in the electrical current supply, it has been found advisable to drive the pistons of the working cylinders 16 by means of compressed air from a large-sized air tank.

However, the use of a pure compressed air drive entails a multiplicity of control problems, especially as it is highly desirable to slow down the speed of the slide member during the period when the rocker is operative to transfer the frame 10 from one station to the next. In order to overcome these difficulties, a kind of "hybrid" system is applied in the described apparatus in which the bottom side of the piston in each working cylinder 16 is directly actuated by the compressed air whereas the top side thereof is only indirectly actuated by an air pressure, namely through a quantity of liquid, which in response to the movements of the piston in the cylinder is caused to flow through a restriction serving as a stroke rate regulator and suitably being of an adjustable type.

A preferred example of such a "hybrid" system for use in the apparatus is illustrated in FIG. 5 wherein the chamber above the piston in each working cylinder 16 as well as a conduit connecting the same to the lower end of a closed, partly air-filled vessel 31 and having a remotely controllable and adjustable restriction 30 therein, one for each cylinder 16, are filled with water as is also the lower part of vessel 31. In order to maintain a desirable air pressure level in said vessel 31, which is common to all the working cylinder 16, the upper part thereof is automatically replenished with compressed air through a charging valve 32 from a source 33 of compressed air including an air tank 34 and an intermittently operating compressor 35 driven by an electric motor. From the air tank 34 compressed air is further selectively delivered to the various working cylinder 16 through solenoid-operated two-way valves 36, one for each working cylinder, which valves are in turn controlled by means of related switches indicated at 37 and forwarding, when closed, control current from a battery 38, which whenever necessary may be charged by means of a charging device 39. It is to be noted that the switches 37 in FIG. 5 are in fact only symbols for more complex groups of co-operating switches, of which certain ones are actuated by the slide members of the various conveyors and certain others by the timers or the programme controller governing the operation of the apparatus. In addition, but for the sake of simplicity not illustrated in FIG. 5, there are switches actuated by the various slide members 19 for electrically adjusting their corresponding restrictions 30 in order to change the speeds of the pistons of the working cylinders 16 during parts of their strokes.

FIGS. 7 to 9 in the drawings illustrate how, in certain cases, the last conveyor 11F in the apparatus may be supplemented with a flaplike lid 40 which, when the slide member 19 is lowered, is deposited over the outlet section 7. The lid 40 is by means of ears 41 suspended in a freely swingable manner from the shaft 22 and is balanced to occupy in its freely suspended condition (FIG. 7) a somewhat inclined position in order to swing over into a horizontal closing position (FIG. 9) at the lowering of the slide member. In the apparatus shown this movement of the lid 40 is utilized also for urging into the drying chamber 8 the frame 10 with developed film, which has just been delivered to the outlet section 7 by the conveyor 11F, the lid 40 thus serving as a combined frame pusher and light lock.

It should be clear that the apparatus shown and described here is only a preferred embodiment of the invention and that various modifications as far as the structural details are concerned may be resorted to. Nevertheless, it is believed that the example given will make it clear that an apparatus embodying the invention offers may valuable advantages and among them not least the possibility of minimizing the total dimension of the apparatus in the direction in which the objects to be treated are to be transported through the same. Also, the space requirement of the apparatus in the transverse direction does not much exceed that of the necessary liquid containers 1 to 5, which makes the apparatus particularly suitable for use in confined premises. Further, as each conveyor 11 forms a separate operational unit, any defective conveyor can easily and rapidly be replaced, and the apparatus may just as easily be adapted to meet more advanced requirements simply by adding a number of containers and conveyors thereto if desired.

As is especially apparent from FIG. 2, all the guideways 12 and working cylinders 16 of the conveyors 11 are located on one side only of the row of treating stations (of which only the inlet section 6 is visible in the figure). Thus, the various bath containers and other stations of the apparatus are easily accessible, e.g. for checking the progress of the treatment or the conditions of the various baths. In addition, the bath containers as well as all the other sections may be easily replaced, when needed, after the slide members 19 of the conveyors 11 have been at least slightly elevated. In FIG. 2 it has further been indicated by dash-and-dot lines that one and the same series of conveyors 11 may, if desired, be used also for serving a second row of stations 1'-7' for which the slide members 19 only have to be equipped with additional arms 20' projecting in a direction opposite to the arms 20 and having their own rockers for handling carrier frames. In this manner the capacity of the apparatus can be doubled or, as an alternative, the supplemented apparatus may be used for carrying out two different treatment processes with different kinds of baths, different dipping times, etcetera. In the last-mentioned case it is also possible, of course, to use different numbers of stations on opposite sides of the series of conveyors and, if so, only some of the slide members thereof have to be equipped with double arms and rockers.

Further it should be mentioned that the carriers of the objects to be treated do not necessarily have to take the form of frames but just as well can be in the form of, for example, simple rods, from which the objects hang down freely, in which case the objects may be kept stretched by means of suitable weights. The essential purpose of the carriers is to assure reliable operation of the conveyors when the latter are transferring the objects from station to station and to keep the objects to be treated in predetermined positions in each of the various stations. In certain cases the carriers can even be represented by such portions of the objects themselves which do not need to be submerged into the various baths and which, thanks to their design, can be easily picked up by the conveyors and also can be used to keep the objects in the desired position at each station.

I claim:

1. A dip treating apparatus for carrying out a multiple-step process in which the objects to be treated have to remain for preselectable periods of time in a number of different treating baths, and for moving in succession at least partially uniform carriers of the objects to be treated through a plurality of stations arranged in a row, one after the other, at least two consecutive ones of said stations including containers for treatment baths, said apparatus comprising a plurality of conveyor means, each of which is adapted to serve two consecutive and adjacent ones of said stations only and is operative to transfer one carrier at a time in a predetermined direction between said two stations, each of said conveyor means comprising a vertical guideway arranged at one side only of the two stations to be served, a slide member reciprocatable along said vertical guideway, driving means for reciprocating said slide member between predetermined end positions, a rocker member mounted on said slide member and capable of oscillating relative thereto between two perative positions by rocking about a horizontal pivot axis extending in a direction across said row of stations, means for forcibly changing the operative position of said rocker member whenever said slide member during its reciprocating movement approaches its respective end positions, and catching means provided on said rocker member in a manner to move in the direction between the two stations served by the conveyor means when said rocker member is forced to change its operative position, said catching means being adapted to pick up the carrier to be transferred at a first one of said two stations at a first level and to deliver it at the second one of said two stations at a second level, wherein said horizontal pivot axis of said rocker member is positioned relative to the slide member in a manner to remain, throughout the entire vertical stroke of said slide member, above the levels at which the carrier is picked up, and delivered respectively, by said catching means of the rocker member, and wherein said catching means are arranged to move along a path below said pivot axis of the rocker member when the latter is forced to change its operative position.

2. A dip treating apparatus as claimed in claim 1 for moving carriers forming with their related objects to be treated suspended units hanging down in a freely swingable manner from said catching means of said rocker member of the conveyor means when being transferred, wherein said rocker member is supported by an arm projecting outwardly from said slide member over the row of stations in a position approximately midway between the two stations served by said conveyor means, said arm forming, when the slide member is in its lowermost end position, an obstruction restricting any excessive swing of the suspended unit being transferred by the next preceding conveyor means in the apparatus.

3. A dip treating apparatus as claimed in claim 2, wherein said arm forms at least a part of a splash-protecting shield extending over substantially the entire width of the stations.

4. A dip treating apparatus as claimed in claim 1, wherein said slide member carries a swingable lid which, when the slide member is lowered, is adapted to be deposited over one of the two stations served by the conveyor means.

5. A dip treating apparatus as claimed in claim 1, wherein said driving means for reciprocating said slide member of the conveyor means comprises a working cylinder mounted in an upright position under the slide member and housing a double-acting piston connected to said slide member, one side of said piston being directly impactable by compressed air, and the other side thereof being indirectly actuated by air pressure through a quantity of liquid, the working cylinder being provided with a stroke rate regulator including a restriction through which the liquid is caused to flow in response to movements of the piston.

6. A dip treating apparatus as claimed in claim 5, wherein said piston of the working cylinder in elevating said slide member is operated against a back pressure created by a quantity of air enclosed in a vessel located outside the working cylinder, 7. A dip treating apparatus as claimed in claim 1, wherein said slide member, said vertical guideway for the same, and said working cylinder of each conveyor form together a separate operational unit which is easily replaceable in the apparatus.

* * * * *